United States Patent [19]
Chapman et al.

[11] Patent Number: 5,531,008
[45] Date of Patent: Jul. 2, 1996

[54] METHOD AND APPARATUS FOR MAKING A BUBBLE SPRING ASSEMBLY

[75] Inventors: Michael J. Chapman, Churchville; Thomas C. Merle; David L. Rowden, both of Rochester, all of N.Y.

[73] Assignee: Eastman Kodak Company, Rochester, N.Y.

[21] Appl. No.: 483,403

[22] Filed: Jun. 7, 1995

[51] Int. Cl.$^6$ .......................... B23P 19/04; B21F 35/00; B25B 27/14

[52] U.S. Cl. .......................... 29/230; 29/281.4; 29/896.9; 72/135

[58] Field of Search .............................. 72/133, 134, 135, 72/137, 166, 426, 427; 29/464, 451, 450, 225, 227, 228, 229, 230, 172, 173, 281.4, 281.5; 360/130.31, 130.32, 130.33

[56] References Cited

U.S. PATENT DOCUMENTS

| | | | |
|---|---|---|---|
| 2,245,407 | 6/1941 | Lignian | 72/134 |
| 4,087,998 | 5/1978 | Hager | 72/166 |
| 4,726,210 | 2/1988 | Weil et al. | 72/133 |
| 4,875,353 | 10/1989 | Kaneko | 72/133 |

*Primary Examiner*—Lowell A. Larson
*Assistant Examiner*—Rodney A. Butler
*Attorney, Agent, or Firm*—Harris, Beach & Wilcox

[57] ABSTRACT

An apparatus for making a bubble spring assembly includes a base member having a side surface and a head assembly. A track way extends along one side surface of the base toward the head assembly. The track way is employed for guiding a respective spring blank into the head assembly. A push block is provided for moving the spring blank along the track way and into the head assembly. A shaping mechanism is provided within the head assembly for receiving the respective spring blank from the track way and for shaping the spring into a predetermined form having a predictable stress strain history along the length of the shaped spring blank. A retaining gate is located proximate the shaping mechanism for positioning a respective cavity block adjacent the shaping mechanism. A transfer rod is provided within the head assembly for moving a shaped spring blank from the shaping mechanism into the cavity block in the absence of further deformation to the shaped spring blank.

24 Claims, 6 Drawing Sheets

METHOD AND APPARATUS FOR MAKING A BUBBLE SPRING ASSEMBLY

BACKGROUND OF THE INVENTION

1. Field of the Invention

This invention relates in general to applying a constant load against a medium subject to large displacements and, in particular, to the manufacturing of an assembly capable of providing such a constant load. More specifically, but without restriction to the particular embodiment hereinafter described in accordance with the best mode of practice, this invention relates to a method and apparatus for making a bubble spring assembly having a predictable and consistent stress strain history along the length of the spring.

2. Discussion of the Related Art

Bubble spring assemblies have recently been employed in a number of electrical and mechanical devices including tape decks, sound recording devices, and automated materials handling machinery. Bubble spring assemblies are commonly employed in a situation requiring a constant load with the ability to accommodate large spacial displacements. A typical application for the bubble spring assembly is to provide a restraining force against a moving piece of magnetic tape so that the tape is held against a recording head under constant pressure.

A bubble spring assembly typically includes a cavity block and a bubble spring. The cavity block includes a shaped hollow cavity formed through the block. The bubble spring is typically small and thin. Delicate handling of the spring is therefore required. The bubble spring is positioned within the cavity to form a convex or arched portion extending beyond the dimensions of the cavity block. In this manner, the bubble spring is placed under tension and will thereby provide a spring force against an article that has displaced the spring into the cavity. Prior to shaping and insertion into the cavity block, the bubble spring is a flat elongated piece of thin material, typically metal, commonly referred to as a spring blank. This type of bubble spring assembly is disclosed in commonly assigned U.S. Pat. No. 5,274,522 issued to P. L. Taillie, Dec. 28, 1993, entitled "Magnetic Head-To-Media Backer Device". An improved bubble spring assembly of this type is disclosed in commonly assigned, copending U.S. patent application Ser. No. 08/431,708 filed Apr. 28, 1995 by D. W. Ryan et al. similarly entitled "Magnetic Head-To-Media Backer Device". These two references are each directed to a bubble spring assembly device and optimized configurations therefor.

It is now understood that assembly techniques for manufacturing the bubble spring assembly play a crucial role in making consistent assemblies having a predictable stress strain history within a required range of tolerances. Consistency in stress strain history of the bubble spring is required so that a specified and predictable force is provided by the spring. Spring blanks are typically loaded into a respective cavity block by skilled assemblers using either industrial tweezers or finger manipulation. These hand techniques may vary from person to person thus resulting in slightly different stress strain histories in a manufactured lot of bubble spring assemblies. This situation is undesirable since a purchaser of large quantities of bubble spring assemblies may require that all purchased bubble spring assemblies perform within exacting tolerances. An additional drawback associated with these hand assembly techniques is that an assembler may become fatigued or lose concentration and plastically deform a spring blank during loading. In this case, the spring blank is unusable and must be replaced since any resulting spring force is severely weakened. Thus, prior hereto, there has not been proposed a method and device for manufacturing a bubble spring assembly with a consistent and predictable stress strain history maintainable over long production periods.

OBJECTS AND SUMMARY OF THE INVENTION

It is, therefore, an object of the present invention to improve bubble spring assemblies.

A further object of this invention to provide an improved method and related apparatus for making bubble spring assemblies.

Another object of this invention is to avoid plastically deforming a spring blank during preliminary handling thereof in a method of assembling a cavity block and a shaped bubble spring.

Still another object of the present invention is to manufacture a bubble spring assembly having a predictable stress strain history associated with the spring.

Yet a further object of the present invention is to enable mass production of a plurality of bubble spring assemblies wherein each assembly has a consistent and predictable stress strain history associated with each respective spring.

Yet another object of the present invention is to minimize the manufacturing time associated with assembling a bubble spring assembly.

Still yet another object of this invention is to avoid undesired elastic deformation of a spring blank upon the shaping and loading of such a spring blank into a cavity block.

An additional object of the present invention is to avoid undesired plastic deformation of a spring blank upon the shaping and loading of such a spring blank into a cavity block.

Still a further object of the present invention is to reduce spring blank waste associated with loading a shaped bubble spring into a cavity block.

These and other objects are attained in accordance with the present invention wherein there is provided an apparatus for making a bubble spring assembly composed of a cavity block and a bubble spring. The apparatus includes a base member having a side surface and a head assembly located adjacent thereto. A track way extends along the side surface toward the head assembly. The track way is employed for guiding a respective spring blank into the head assembly. A push block is provided for moving the spring blank along the track way and into the head assembly. In accordance with one aspect of the present invention, the push block is capable of moving the respective spring blank along the track way without causing deformation to the spring blank.

According to another aspect of this invention, a shaping mechanism is provided within the head assembly for receiving the respective spring blank from the track way and for shaping the spring blank into a predetermined form having a predictable stress strain history along the length of the shaped spring blank. A retaining gate is located proximate the shaping mechanism for positioning a respective cavity block adjacent the shaping mechanism. A transfer rod is provided within the head assembly for moving a shaped spring blank from the shaping mechanism into the cavity block in the absence of further deformation to the shaped spring blank. In this manner, when the transfer rod moves the shaped spring blank into the cavity block, the bubble spring assembly is completed and easily removed from the retaining gate.

In accordance with the method of the present invention, a bubble spring assembly may be assembled by first placing a spring blank on a sliding track way without causing deformation to the spring blank and then moving the spring blank along the track way toward a shaping slot in the absence of causing deformation to the spring blank. Thereafter, the spring blank is urged into the shaping slot so that the spring blank is shaped into a predetermined form having a predictable stress strain history along the length thereof. Next, the shaped spring blank is transferred into the cavity block while avoiding further deformation thereto.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing, wherein.

DETAILED DESCRIPTION OF A PREFERRED EMBODIMENT

Figure 1:
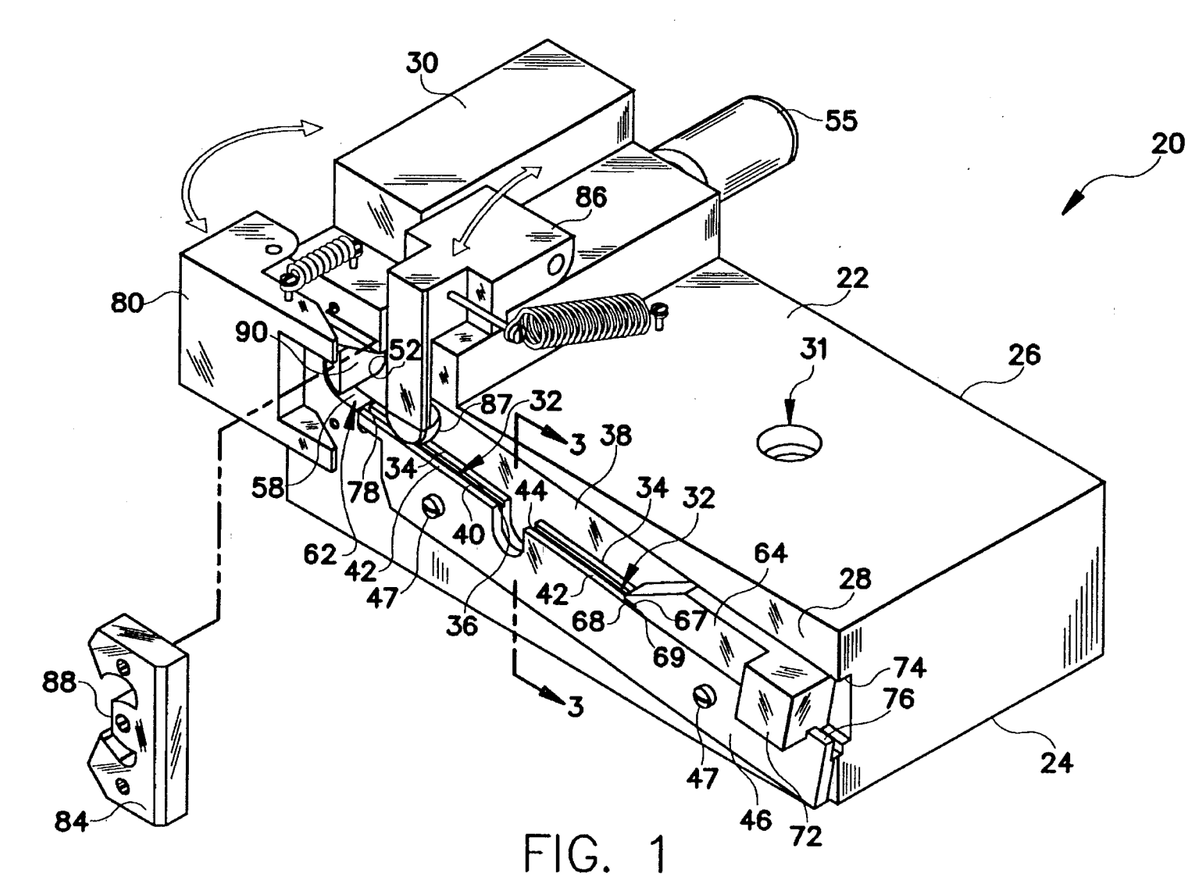
FIG. 1 is a perspective view of an apparatus for making a bubble spring assembly in accordance with the present invention.
Figure 2:
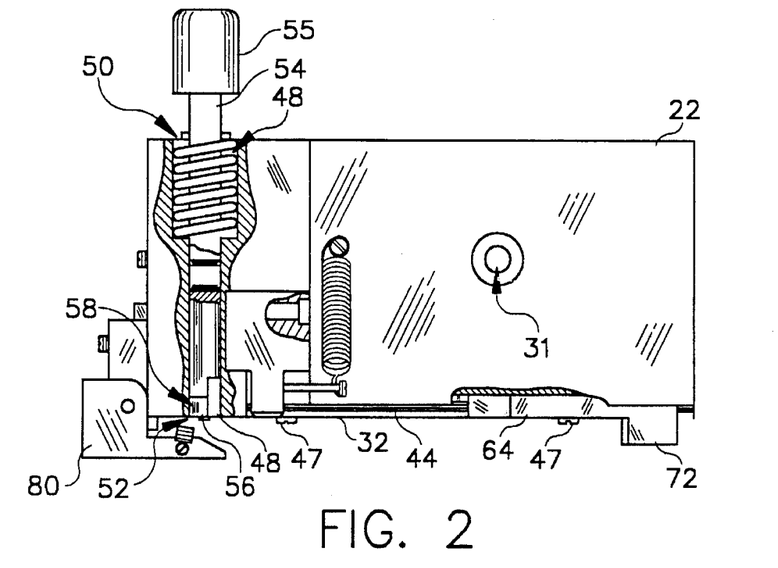
FIG. 2 is a partially broken away plan view of the apparatus illustrated in FIG. 1.
Figure 3:
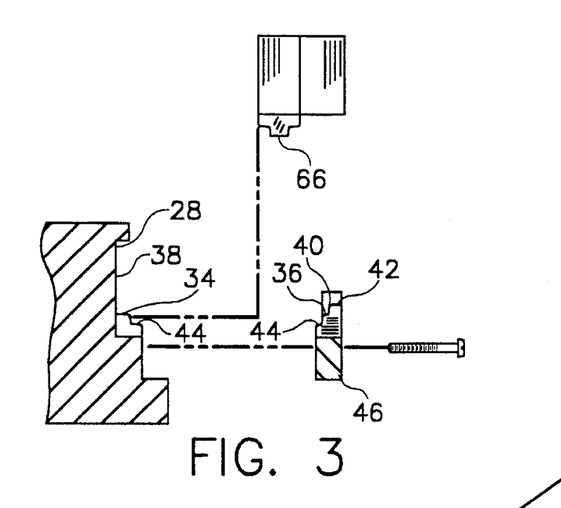
FIG. 3 is an isolated exploded cross-sectional view taken along line 3—3 of FIG. 1.

Referring now to FIGS. 1 and 2, there is shown a bubble spring making apparatus or spring blank shaper 20 in accordance with the present invention. The shaper 20 includes a base member 22 having a bottom surface 24, opposing side surfaces 26 and 28, and a head assembly 30. The base member 22 includes a mounting hole 31 so that the shaper 20 may be secured by means of a bolt to a flat working surface such as a work bench or assembly table. Alternatively, the shaper 20 may be operated in a hand-held fashion. The side surface 28 is provided with a track way or channel 32 that is inclined upwardly toward the head assembly 30. For conveniently and clearly describing the present invention, the various directional references used herein are taken relative to the reference frame of the drawing, it being understood that actual use of the spring blank shaper 20 is preferably conducted with the indicated orientation. The channel 32 has a lower riding surface preferable formed by a pair of parallel riding rails 34 and 36, best illustrated in FIG. 3. Each of the riding rails 34 and 36 includes a corresponding retaining wall or side 38 and 40 respectively. As shown in FIG. 3, retaining wall 38 is formed by the portion of the side surface 28 extending along the length of the riding rail 34. The retaining wall 40 is formed by a ridge member 42. A groove 44 is formed between the riding rails 34 and 36, FIGS. 1 and 3. The groove 44 and the riding rail 34 are preferably machined onto a side bar 46 which is secured to the side surface 28 by a pair of fasteners 47—47. In this manner, the riding rail 34 and the part of the groove 44 adjacent thereto are more easily machined into the side surface 28. The side bar 46 and the base member 22 including the head assembly 30 are preferably formed from a hard machineable material such a steel.

Figure 5:
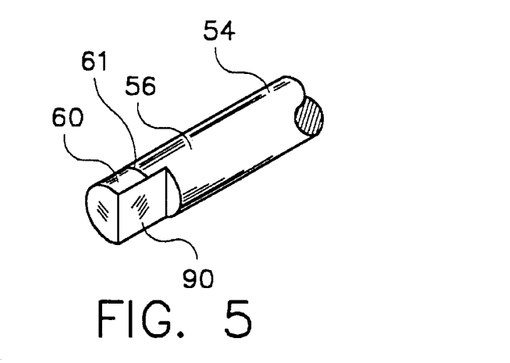
FIG. 5 is an isolated perspective view of the proximal end of a spring biased loading rod used in connection with the method and apparatus of this invention.
Figure 7:
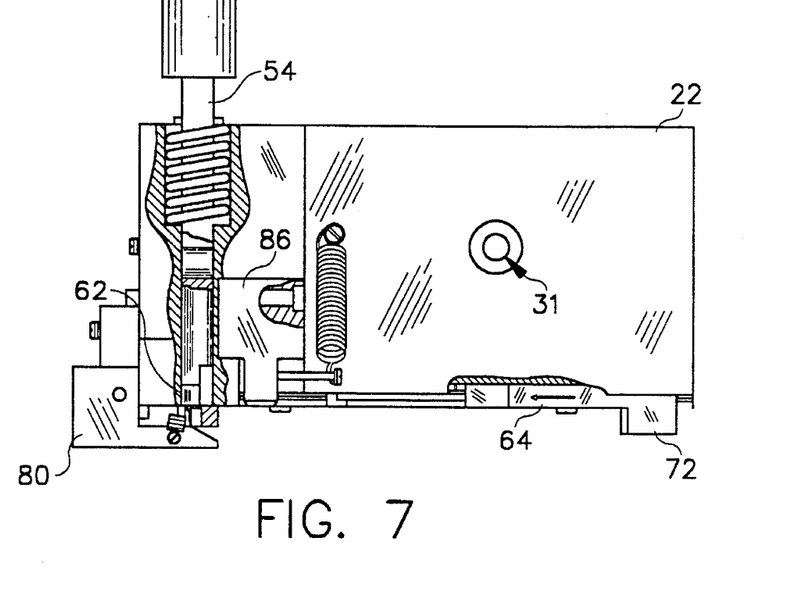
FIG. 7 is a partially broken away plan view similar to FIG. 2 illustrating the non-deforming moving step of the method of this invention.
Figure 8:
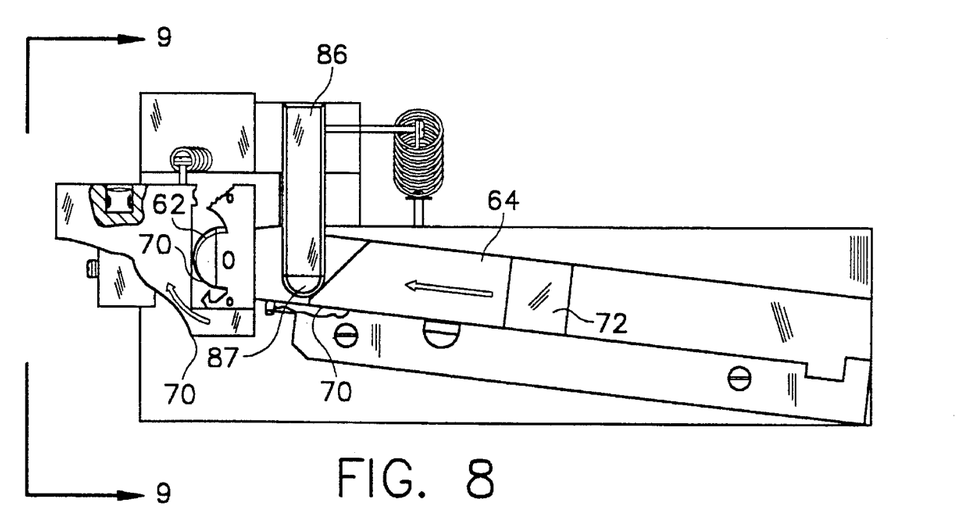
FIG. 8 is a partially broken away side elevation view showing partial formation of a shaped spring blank according to the method of the present invention.
Figure 9:
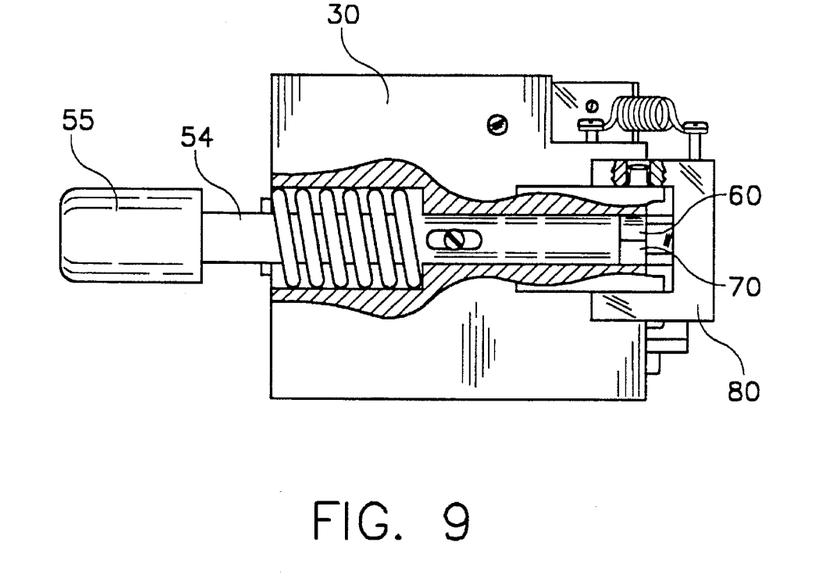
FIG. 9 is an expanded broken away elevation view taken along line 9—9 of FIG. 8 illustrating another view of the partially shaped spring blank within a shaping slot in accordance with this invention.

The head assembly 30 includes a lateral bore hole 48 extending therethrough from a distal end opening 50 to a proximal end opening 52. As illustrated, bore hole 48 is substantially perpendicular to the channel 32. The bore hole 48 contains a spring biased loading rod 54 having a distal knob 55 and a proximal tip 56, FIG. 5. The head assembly 30 is also provided with an arcuate shaping cavity 58, best shown in FIG. 1, positioned adjacent the proximal end opening 52 of bore hole 48. An essentially half-round rabbet 60 having a shoulder 61 is formed around the proximal tip 56 of the loading rod 54. As illustrated in FIGS. 1 and 2, the proximal tip 56 of the loading rod 54 extends into the shaping cavity 58. In this manner, when the loading rod 54 is in a rest position being a normally shaping position, the shaping cavity 58 and the half-round rabbet 60 are in register with each other to create a forming mechanism or shaping slot 62, as best illustrated in FIGS. 7 and 8.

Figure 4:
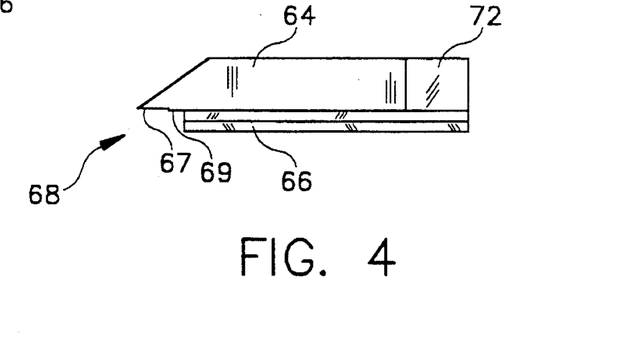
FIG. 4 is an isolated side elevation view of a push block as used in conjunction with the apparatus of the present invention.
Figure 6:
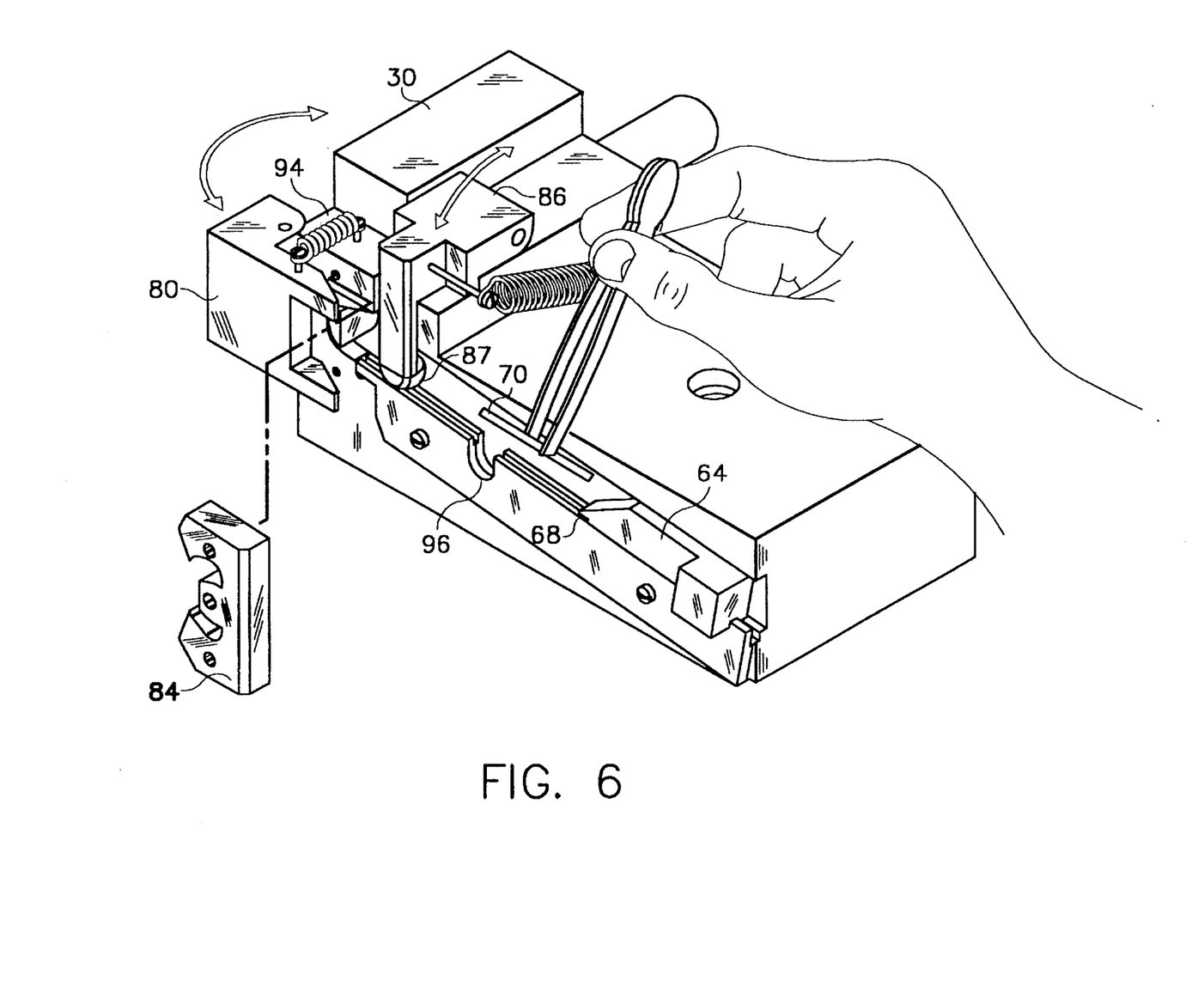
FIG. 6 is a perspective view of the present apparatus for making a bubble spring assembly illustrating preferred first steps in making an assembly in accordance with the method of the present invention.

The spring blank shaper 20 is provided with a sliding push block 64 which slides along the channel 32. The push block 64 includes a longitudinal rib member 66 positionable within the groove 44 between the riding rails 34 and 36. The push block 64 includes a front notch 68, FIGS. 1 and 4, under which a spring blank 70, FIG. 6, is retained when the push block 64 is employed according to the method of this invention. The front notch 68 is formed by a top retaining surface 67 and a forward push face 69. This method includes moving the spring blank 70 along the riding rails 34 and 36 of the channel 32 in a manner that does not cause deformation to, or scratches on, the spring blank 70. This method will be described in further detail below in reference to FIGS. 6–12. The push block 64 includes a rear knob member 72 employed to move the push block 64 along the channel 32. To further retain the push block 64, the channel 32 also includes an upper retaining ridge 74, FIG. 1, formed in the side surface 28 and extending substantially parallel to the riding rails 34 and 36. In this manner, the push block 64 is restrained against displacement along a direction normal to the riding rails. The channel 32 further includes a rear stop block 76 for preventing the push block 64 from discharging from the rear of the channel. A forward stop block 78 is provided within the groove 44 at the forward end of the channel 32, FIG. 1, so that as the push block 64 is moved toward the shaping slot 62, the longitudinal rib member 66 will engage the forward stop block 78 at a predetermined location to prevent further forward movement of a respective spring blank 70 and position the shaped spring blank 70, FIG. 10, accurately for loading. As should be readily apparent, the push block 64 and front notch 68 including its top retaining surface 67 and forward push face 69, are capable of moving a respective spring blank 70 along the channel 32 toward the shaping slot 62 without causing deformation to the spring blank.

The head assembly 30 is provided with a spring biased gate member 80 with extension arms 82 for holding a respective cavity block 84 adjacent the proximal end opening 52 of the bore hole 48. A spring biased anti-buckling arm 86 having a retaining tip 87 is also provided on the head assembly 30. The anti-buckling arm 86 extends toward the channel 32 adjacent the shaping slot 62 so that when a spring blank 70 enters the shaping slot, the anti-buckling arm 86 will hold the spring blank against the riding rails 34 and 36 to thereby prevent buckling during shaping of the spring blank. The spring biased gate member 80, the anti-buckling arm 86, and the push block 64 are preferably formed and machined from acetal, a hard thermoplastic material that is easily machined and which provides a suitable low friction surface. The cavity block 84 intended to be used in conjunction with the spring blank shaper 20, includes a flat head 88 that is, when mounted behind the gate member 80, aligned adjacent a corresponding flat surface 90, FIGS. 1 and 5, formed in the proximal end 56 of the loading rod 54.

Figure 10:
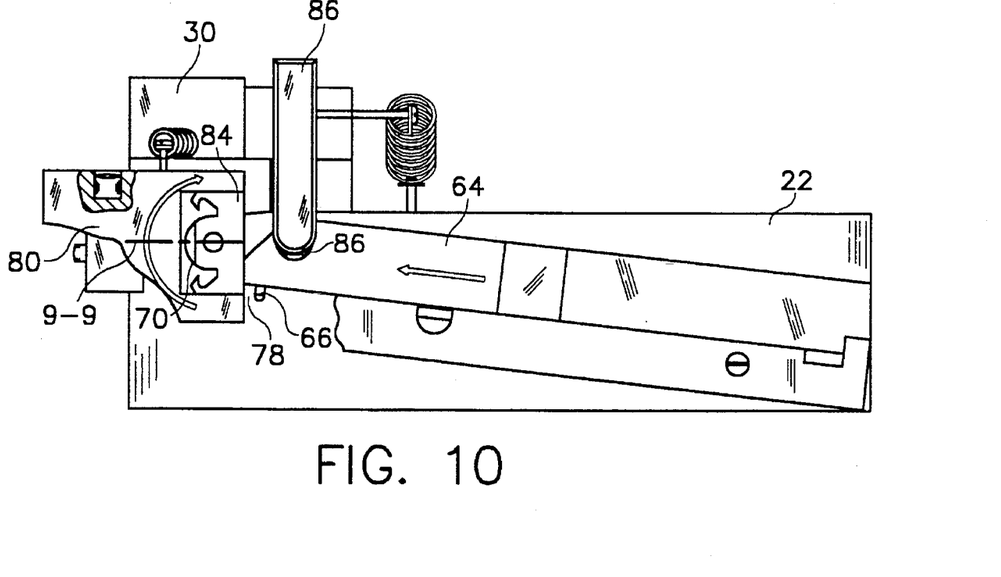
FIG. 10 is a partially broken away side elevation view similar to FIG. 8 showing completed formation of a shaped spring blank according to the method of this invention.

The method of the present invention will now be described in detail with particular reference to FIGS. 6–12. From the outset, it should be understood that the spring blank 70 is a delicate and fragile item. The typical spring blank 70 has a thickness of approximately 0.0015 inches (0.0381 mm), a length of less than an inch (2.54 cm), and a width not usually exceeding 0.5 inches (1.27 cm). The spring blank 70 is commonly formed from stainless steel. In many applications, the spring blank 70 includes a highly burnished surface that will contact supersensitive material. In these applications it is imperative that the shaped bubble spring have not only a predictable stress strain history resulting from the shaping process, but also retain the qualities associated with the burnished surface by avoiding even minor or hairline scratches. A first step in the method of this invention may include swinging open the gate member 80 and securing a respective cavity block 84 on a pair of mounting tabs 94—94 and allowing the gate member 80 to close against the cavity block. As illustrated in FIG. 6, the channel 32 includes a letting notch 96 that allows a spring blank 70 to be carefully placed on the riding rails 34 and 36. Thereafter, the push block 64 is moved forward so that the forward push face 69 of the front notch 68 engages the trailing edge of the spring blank 70 as shown in FIG. 7. As the push block 64 is moved further forward, FIGS. 8 and 9, the leading edge of the spring blank 70 begins to enter the shaping slot 62. The shaping slot 62 preferably has a thickness substantially equal to the thickness of the spring blank 70 so that only one spring blank at a time may be moved into the shaping slot. As successive spring blanks are moved into the shaping slot 62 in accordance with this method, the exact machining and tolerances of the operable components in the head assembly will cause each shaped bubble spring to have a substantially identical predetermined form with a predictable stress strain history along the entire length of the bubble spring. As the spring blank 70 is urged into the shaping slot 62, the retaining tip 87 of the anti-buckling arm 86 will keep trailing segment of the spring blank held against the riding rails 34 and 36. FIG. 10 shows that as the push block 64 is moved forward, it will eventually stop when the rib member 66 of the push block hits the forward stop block 78. In this condition, the spring blank 70 is fully inserted into the shaping slot 62 and symmetrically shaped about a central axis a—a. At this point, the spring blank 70 becomes a fully shaped spring blank. The distance between the end of the rib member 66 and the forward push face 69 of the front notch 68 in relation to the location of the forward stop block 78, is selected so that this desired symmetry is achieved. FIG. 10 also illustrates that when the push block 64 is moved into the full forward position, the anti-buckling arm 86 is moved outwardly by virtue of its hinge point and biasing spring. In this position, the trailing edge of the partially shaped spring blank is sufficiently secured by the top retaining surface 67 of the front notch 68 to prevent buckling during partial entry into the shaping slot 62.

Figure 11:
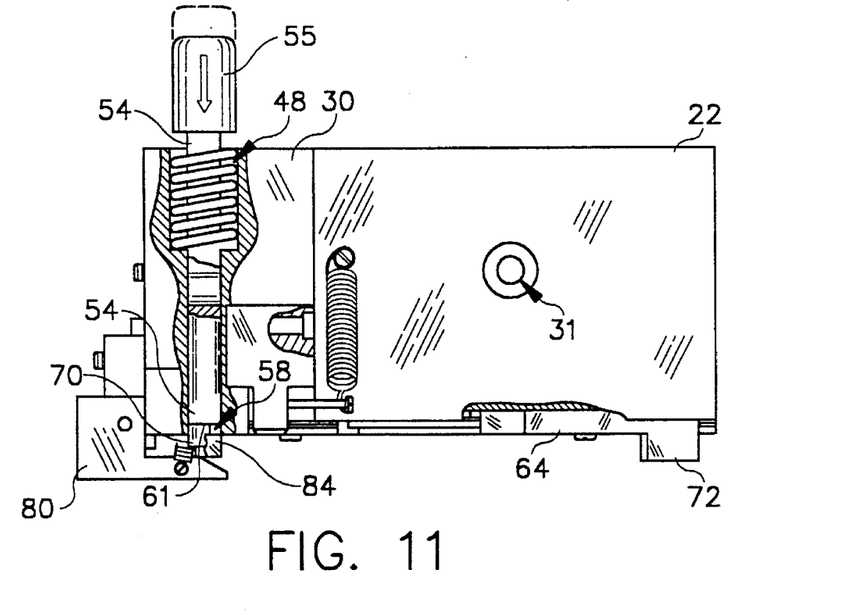
FIG. 11 is a partially broken away plan view similar to FIG. 7 illustrating the non-deforming transfer of the fully shaped spring blank into a cavity block in accordance with the method of this invention.
Figure 12:
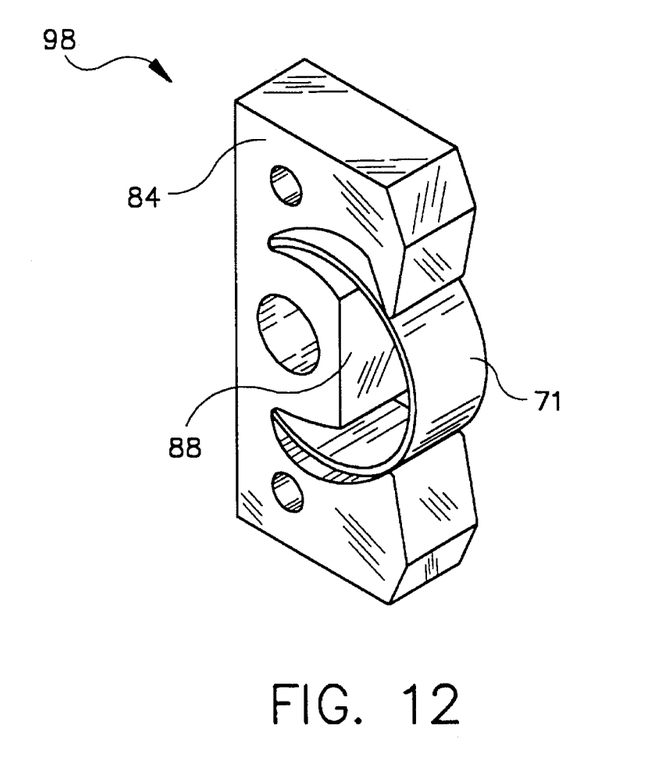
FIG. 12 is an isolated perspective view of a bubble spring assembly made in accordance with the apparatus and method of the present invention.

With reference to FIG. 11, the final transfer and assembly steps of the present method will now be described. FIG. 11 shows that once the spring blank 70 is fully shaped in the shaping slot 62, the loading arm 54 may be pushed so that the proximal tip 56 of the arm 54 is caused to extend outwardly from the proximal end opening 52 of the bore hole 48. As this movement proceeds, the flat surface 90 of the loading rod 54 will slide across the flat head 88 of the cavity block 84 and the retaining shoulder 61 will move the fully shaped spring blank 70 along with the loading rod. In this manner, the retaining shoulder 61 necessarily urges the fully shaped spring blank 70 away from shaping cavity 58 for transfer into the cavity block 84 in a manner that does not cause further deformation to the shaped spring blank 70. When the distal knob 55 of the loading rod 54 hits the side of the head assembly 30, the shaped spring blank 70 is moved out of the shaping cavity 58 and loaded into the cavity block 84 so that the long edges of the shaped spring blank are flush with the side surfaces of the cavity block 84. To achieve this proper alignment, the distance the loading rod 54 travels is set to correspond to the thickness of the cavity block 84. At this time, the distal knob 55 may be released and the gate member 80 opened to remove a completed bubble spring assembly 98 as shown in FIG. 12. Once the assembly is completed, the fully shaped spring blank 70 becomes a bubble spring 71 exhibiting spring-like characteristics.

While this invention has been described in detail with reference to a certain preferred embodiment, it should be appreciated that the present invention is not limited to that precise embodiment. For example, the apparatus of the present invention may be readily modified to make bubble spring assemblies with asymmetrically shaped bubble springs. Similarly, the present apparatus may be easily adapted for use with cavity blocks having shapes not including a flat head member. In addition, the loading rod need not necessarily be round, but alternatively may be of any other suitable shape such as elliptical in cross section. Thus, in view of the present disclosure which describes the current best mode for practicing the invention, many modifications and variations would present themselves to those of skill in the art without departing from the scope and spirit of this invention, as defined in the following claims.

What is claimed is:

1. An apparatus for making a bubble spring assembly including a cavity block and a bubble spring, said apparatus comprising:

a base member having a side surface and a head assembly positioned adjacent thereto;

track means extending along said side surface toward said head assembly, said track means for guiding a spring blank into said head assembly;

means for moving the spring blank along said track means and into said head assembly;

shaping means positioned within said head assembly for receiving the spring blank from said track means and for shaping the spring blank into a predetermined form;

retaining means located proximate said shaping means for positioning a respective cavity block adjacent said shaping means; and transfer means for moving a shaped bubble spring blank from said shaping means into the cavity block without further deformation to said shaped bubble spring blank whereby when said transfer means moves said shaped bubble spring blank into the cavity block, said bubble spring assembly is thereby formed and removable from said retaining means.

2. The apparatus according to claim 1 further including means for preventing buckling of said respective spring blank as it is moved into said shaping means by said means for moving.

3. The apparatus according to claim 1 wherein said track means includes a channel extending toward said head means, said channel having a lower riding surface with retaining sides, said lower riding surface including a groove formed therein.

4. The apparatus according to claim 1 wherein said head assembly includes a lateral bore hole extending therethrough from a distal end opening to a proximal end opening, said lateral bore hole being substantially perpendicular to said track means, and said transfer means includes a spring biased loading rod having a proximal tip extending into said shaping means.

5. The apparatus according to claim 1 wherein said means for moving is capable of moving the spring blank along said track means without causing deformation to the spring blank.

6. The apparatus according to claim 1 wherein said retaining means includes a spring biased gate member with extension arms for holding said respective cavity block adjacent said shaping means.

7. The apparatus according to claim 2 wherein said means for preventing buckling includes a spring biased arm extending toward said track means adjacent said shaping means so that when said spring blank enters said shaping means, said spring biased arm will hold said spring blank against said track means to thereby prevent buckling during shaping of said spring blank.

8. The apparatus according to claim 3 wherein said means for moving said spring blank includes a sliding push block having a longitudinal rib member positionable within said groove of said lower riding surface.

9. The apparatus according to claim 8 wherein said sliding push block includes a front notch member under which said spring block is retained when said sliding push block is employed to move said spring blank along said lower riding surface of said channel.

10. The apparatus according to claim 8 wherein said sliding push block includes a rear knob member employed to move said sliding push block along said lower riding surface of said channel.

11. The apparatus according to claim 8 wherein said channel further includes an upper retaining ridge extending substantially parallel to said lower riding surface, said sliding push block thereby being restrained against displacement along a direction normal to said lower riding surface.

12. The apparatus according to claim 8 wherein said channel further includes a rear stop block for preventing said sliding push block from discharging from said channel.

13. The apparatus according to claim 8 wherein said channel further includes a forward stop block positioned within said groove of said lower riding surface so that as said sliding push block is moved toward said shaping means, said longitudinal rib member will engage said forward stop block at a predetermined location to prevent further forward movement of said spring blank.

14. The apparatus according to claim 13 wherein said predetermined location is selected so that said spring blank is symmetrically shaped about a central axis.

15. The apparatus according to claim 4 wherein said shaping means includes an arcuate shaping cavity positioned adjacent said proximal end opening of said lateral bore hole and an essentially half-round rabbet formed around the proximal tip of said spring biased loading rod whereby when said loading rod is in a normally shaping position, said arcuate shaping cavity and said essentially half-round rabbet are in register with each other to form a shaping slot.

16. The apparatus according to claim 15 wherein said shaping slot has a thickness substantially equal to the thickness of said spring blank so that only one spring blank may be moved into said shaping slot.

17. The apparatus according to claim 15 wherein said essentially half-round rabbet includes a retaining shoulder so that when said spring biased loading rod is moved into a loading position, said retaining shoulder urges said shaped spring blank away from said arcuate shaping cavity for transfer into said cavity block of said bubble spring assembly.

18. The apparatus according to claim 6 wherein said spring biased gate member is formed from a thermoplastic material.

19. The apparatus according to claim 7 wherein said spring biased arm is formed from a thermoplastic material.

20. A method for making a bubble spring assembly including a cavity block and a bubble spring, said method comprising the steps of:

placing a spring blank on a sliding track way without causing deformation to said spring blank;

urging said spring blank into a shaping slot so that said spring blank is shaped into a predetermined form to thereby make a shaped spring blank; and transferring said shaped spring blank into the cavity block while avoiding further deformation to said shaped spring blank.

21. The method according to claim 20 further including the step of positioning said cavity block adjacent said shaping slot prior to said transferring step.

22. The method according to claim 20 further including the step of preventing buckling of said spring blank within said track way during said urging step.

23. The method according to claim 20 wherein said urging step further includes symmetrically shaping said spring blank about a central axis.

24. The method according to claim 20 further including the step of moving said spring blank along said track way toward said shaping slot in the absence of causing deformation to said spring blank, said moving step occurring before said urging step.

* * * * *